(12) United States Patent
Lee et al.

(10) Patent No.: US 11,848,477 B2
(45) Date of Patent: Dec. 19, 2023

(54) ELECTRONIC APPARATUS FOR TRANSMITTING SIGNALS THROUGH PLURALITY OF ANTENNAS, AND STRUCTURE THEREFOR

(71) Applicant: SAMSUNG ELECTRONICS CO., LTD., Suwon-si (KR)

(72) Inventors: Dongju Lee, Suwon-si (KR); Bongsup Son, Suwon-si (KR); Kyoungsun Lee, Suwon-si (KR); Wonjin Choi, Suwon-si (KR); Jiwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 17/260,119

(22) PCT Filed: May 15, 2019

(86) PCT No.: PCT/KR2019/005819
§ 371 (c)(1),
(2) Date: Jan. 13, 2021

(87) PCT Pub. No.: WO2020/027410
PCT Pub. Date: Feb. 6, 2020

(65) Prior Publication Data
US 2021/0288401 A1   Sep. 16, 2021

(30) Foreign Application Priority Data

Aug. 3, 2018   (KR) .................. 10-2018-0090637

(51) Int. Cl.
*H01Q 1/24*  (2006.01)
*H01Q 1/52*  (2006.01)
(Continued)

(52) U.S. Cl.
CPC .............. *H01Q 1/523* (2013.01); *H01Q 1/243* (2013.01); *H04B 7/0413* (2013.01); *H04W 88/06* (2013.01)

(58) Field of Classification Search
CPC .......... H01Q 1/523; H01Q 1/243; H01Q 9/42; H01Q 1/521; H01Q 21/28; H04B 7/0413;
(Continued)

(56) References Cited

U.S. PATENT DOCUMENTS

| 8,654,030 B1 | 2/2014 | Mercer |
| 9,432,070 B2 | 8/2016 | Mercer |

(Continued)

FOREIGN PATENT DOCUMENTS

| KR | 101600268 B1 * | 6/2004 | ............... H01Q 1/24 |
| KR | 10-2013-0041610 | 4/2013 | |

(Continued)

OTHER PUBLICATIONS

International Search Report for PCT/KR2019/005819 dated Aug. 27, 2019, 5 pages.
(Continued)

*Primary Examiner* — Hai V Tran
*Assistant Examiner* — Bamidele A Jegede
(74) *Attorney, Agent, or Firm* — Nixon & Vanderhye, P.C.

(57) ABSTRACT

An electronic device may include a housing including a first conductive portion, a second conductive portion electrically isolated from the first conductive portion, and a third conductive portion electrically isolated from the first conductive portion and the second conductive portion, a first wireless communication circuit disposed in the space and to transmit or receive a first signal and a second signal, which have a frequency in a first frequency range, through Multiple Input Multiple Output (MIMO) using the first conductive portion
(Continued)

and the second conductive portion, respectively, and a second wireless communication circuit disposed in the space and transmit or receive a third signal and a fourth signal having a frequency in a second frequency range through Carrier Aggregation (CA) using the third conductive portion and the conductive pattern, respectively.

14 Claims, 15 Drawing Sheets

(51) Int. Cl.
 *H04B 7/0413* (2017.01)
 *H04W 88/06* (2009.01)
(58) Field of Classification Search
 CPC ........ H04B 1/00; H04B 1/401; H04B 7/0608; H04W 88/06
 See application file for complete search history.

(56) References Cited

U.S. PATENT DOCUMENTS

| | | | |
|---|---|---|---|
| 9,712,204 | B2 | 7/2017 | Jain et al. |
| 9,806,401 | B2 | 10/2017 | Caballero et al. |
| 9,900,894 | B2 | 2/2018 | Jung et al. |
| 10,020,563 | B2 | 7/2018 | Caballero et al. |
| 10,340,592 | B2 | 7/2019 | Nam et al. |
| 10,511,084 | B2 | 12/2019 | Caballero et al. |
| 10,734,705 | B2 | 8/2020 | Choi et al. |
| 2002/0106995 | A1* | 8/2002 | Callaway, Jr. ......... H01Q 1/241 375/267 |
| 2012/0112970 | A1* | 5/2012 | Caballero ........... H04M 1/0202 343/702 |
| 2012/0299785 | A1* | 11/2012 | Bevelacqua ........... H01Q 13/10 343/702 |
| 2015/0109170 | A1* | 4/2015 | Kang .................. H04M 1/0277 343/702 |
| 2015/0373441 | A1* | 12/2015 | Behles .................. G06F 1/1637 381/333 |
| 2017/0045916 | A1* | 2/2017 | Kim ........................ G06F 1/163 |
| 2017/0201011 | A1* | 7/2017 | Khripkov ................. H01Q 1/42 |
| 2017/0250460 | A1* | 8/2017 | Shin ........................ H01Q 21/28 |
| 2017/0273090 | A1* | 9/2017 | Jung ..................... H04B 7/0404 |
| 2017/0294705 | A1* | 10/2017 | Khripkov ................. H01Q 1/38 |
| 2017/0310344 | A1* | 10/2017 | Lee ......................... H04B 1/006 |
| 2017/0338850 | A1 | 11/2017 | Jain et al. |
| 2017/0358847 | A1* | 12/2017 | Cho ..................... H05K 1/0218 |
| 2018/0034148 | A1* | 2/2018 | Nam ........................ H01Q 1/50 |
| 2018/0151943 | A1* | 5/2018 | Lee ........................ H01Q 13/10 |
| 2018/0248251 | A1* | 8/2018 | Son ........................ H01Q 21/28 |
| 2018/0331418 | A1* | 11/2018 | Kim ....................... H01Q 1/243 |
| 2019/0027807 | A1* | 1/2019 | Choi ...................... H01Q 5/378 |
| 2019/0027808 | A1* | 1/2019 | Mow ........................ H04R 5/04 |
| 2019/0036210 | A1* | 1/2019 | Kim ....................... H01Q 13/10 |
| 2019/0067821 | A1* | 2/2019 | Kim ....................... H01Q 5/371 |
| 2019/0109622 | A1* | 4/2019 | Wang ................... H04B 7/0434 |
| 2019/0140342 | A1* | 5/2019 | Lim ....................... H01Q 13/10 |
| 2019/0207318 | A1* | 7/2019 | Wu .......................... H01Q 9/26 |
| 2020/0203804 | A1* | 6/2020 | Khripkov .............. H01Q 21/24 |

FOREIGN PATENT DOCUMENTS

| | | |
|---|---|---|
| KR | 10-2015-0079564 | 7/2015 |
| KR | 10-1600268 | 3/2016 |
| KR | 10-2017-0107302 | 9/2017 |
| KR | 10-2018-0013615 | 2/2018 |
| WO | 2017/126863 | 7/2017 |
| WO | 2017/183802 | 10/2017 |

OTHER PUBLICATIONS

Written Opinion of the ISA for PCT/KR2019/005819 dated Aug. 27, 2019, 4 pages.
Request for the Submission of an Opinion dated Jul. 15, 2022 Korean Application No. 10-2018-0090637 and English- language translation.

* cited by examiner

ELECTRONIC APPARATUS FOR TRANSMITTING SIGNALS THROUGH PLURALITY OF ANTENNAS, AND STRUCTURE THEREFOR

This application is the U.S. national phase of International Application No. PCT/KR2019/005819 filed May 15, 2019 which designated the U.S. and claims priority to KR Patent Application No. 10-2018-0090637 filed Aug. 3, 2018, the entire contents of each of which are hereby incorporated by reference.

BACKGROUND

Field

Embodiments in the disclosure relates to an electronic device, capable of transmitting a signal through a plurality of antennas, and a structure for the same.

Description of Related Art

An electronic device may support Carrier Aggregation (CA) when transmitting an uplink (UL) signal or a downlink (DL) signal based on a cellular communication protocol (e.g., Long Term Revolution (LTE)) defined in a $3^{rd}$ generation partnership project (3GPP). The electronic device may include a plurality of antennas to transmit or receive a signal based on CA. Some of the plurality of antennas may correspond to primary carrier component (PCC) antennas and others of the plurality of antennas may correspond to secondary carrier component (SCC) antennas.

The electronic device may include a plurality of antennas to transmit or receive a signal through Multiple Input Multiple Output (MIMO) based on a wireless local area networking (WLAN) protocol (e.g., wireless fidelity; Wi-Fi) complying with an Institute of Electrical and Electronics Engineers (IEEE) 802.11 standard

SUMMARY

When the electronic device supports all a CA technology based on the cellular communication protocol and an MIMO technology based on a WLAN protocol, a frequency interference or the degradation in antenna performance may be caused by the arrangement of a plurality of antennas mounted in the electronic device. The frequency interference or the degradation in antenna performance may be caused, for example, between antennas supporting the cellular communication protocol, between antennas supporting the WLAN protocol, or between antenna supporting both the cellular communication protocol and the antenna supporting the WLAN protocol.

Embodiments in the disclosure may provide an arrangement structure capable of preventing frequency interference and the degradation in performance between a plurality of antennas mounted in an electronic device.

According to an embodiment of the disclosure, an electronic device may include a housing including a first plate, a second plate facing a direction opposite to the first plate, a side member surrounding a space between the first plate and the second plate, a first conductive portion, a second conductive portion electrically isolated from the first conductive portion, and a third conductive portion electrically isolated from the first conductive portion and the second conductive portion, a polymer structure disposed in the space, a conductive pattern formed inside the polymer structure or on the polymer structure, a first wireless communication circuit disposed in the space to transmit or receive a first signal and a second signal, which have a frequency in a first frequency range, through Multiple Input Multiple Output (MIMO) using the first conductive portion and the second conductive portion, respectively, and a second wireless communication circuit disposed in the space to transmit or receive a third signal and a fourth signal, which have a frequency in a second frequency range, through Carrier Aggregation (CA) using the third conductive portion and the conductive pattern, respectively.

According to an embodiment of the disclosure, an electronic device may include a housing including a first plate, a second plate facing a direction opposite to the first plate, a side member surrounding a space between the first plate and the second plate, a first conductive portion, a second conductive portion electrically isolated from the first conductive portion, and a third conductive portion electrically isolated from the first conductive portion and the second conductive portion, a polymer structure disposed in the space, a conductive pattern formed inside the polymer structure or on the polymer structure, a first wireless communication circuit disposed in the space to transmit or receive a first signal and a second signal, which have a frequency in a first frequency range, through Multiple Input Multiple Output (MIMO), a second wireless communication circuit disposed in the space to transmit or receive a third signal and a fourth signal having a frequency in a second frequency range through Carrier Aggregation (CA), and a control circuit operatively connected with the first wireless communication circuit and the second wireless communication circuit. The control circuit may transmit or receive the first signal and the second signal using the first conductive portion and the second conductive portion, respectively, transmit or receive the second signal and the third signal using the third conductive portion and the conductive pattern, respectively, when the first wireless communication circuit is activated, and transmit or receive the third signal using the third conductive portion, and transmit or receive the fourth signal using the second conductive portion, when the first wireless communication circuit is inactivated.

According to an embodiment of the disclosure, an electronic device may include a housing including a first plate, a second plate facing a direction opposite to the first plate, a side member surrounding a space between the first plate and the second plate, a first conductive portion, and a second conductive portion electrically isolated from the first conductive portion, a polymer structure disposed in the space, a conductive pattern formed inside the polymer structure or on the polymer structure, a first wireless communication circuit disposed in the space to transmit or receive a first signal, which has a frequency in a first frequency range, a second wireless communication circuit disposed in the space to transmit or receive a second signal and a third signal having a frequency in a second frequency range through CA, and a control circuit operatively connected with the first wireless communication circuit and the second wireless communication circuit. The control circuit may transmit or receive the first signal using the first conductive portion, and transmit or receive the second signal and the third signal using the second conductive portion and the conductive pattern, respectively, when the first wireless communication circuit is activated, and may transmit or receive the second signal using the second conductive portion, and transmit or receive the third signal using the first conductive portion, when the first wireless communication circuit is inactivated.

According to embodiments in the disclosure, the electronic device may reduce the frequency interference between the antennas while transmitting a signal through the plurality of antenna.

According to embodiments in the disclosure, the electronic device may improve the isolation between the antennas while supporting the CA technology and the MIMO technology.

Besides, a variety of effects directly or indirectly understood through the disclosure may be provided.

BRIEF DESCRIPTION OF THE DRAWINGS

With respect to the description of the drawings, the same or similar reference signs may be used for the same or similar elements.

DETAILED DESCRIPTION

Hereinafter, various embodiments of the present invention will be described in detail with reference to the accompanying drawings. However, it should be understood that the present invention is not limited to specific embodiments, but rather includes various modifications, equivalents and/or alternatives of embodiments of the present invention.

Figure 1:
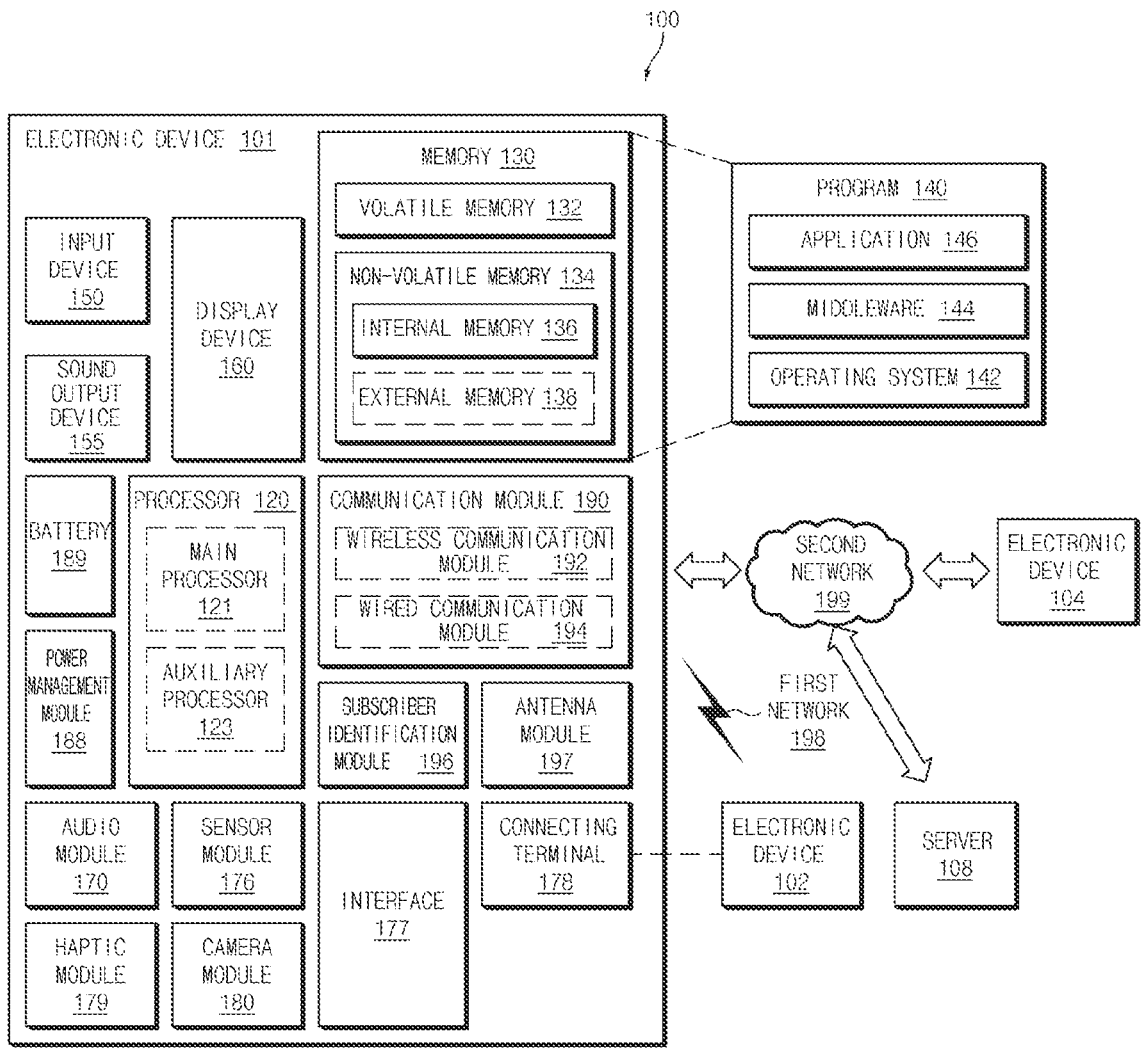
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
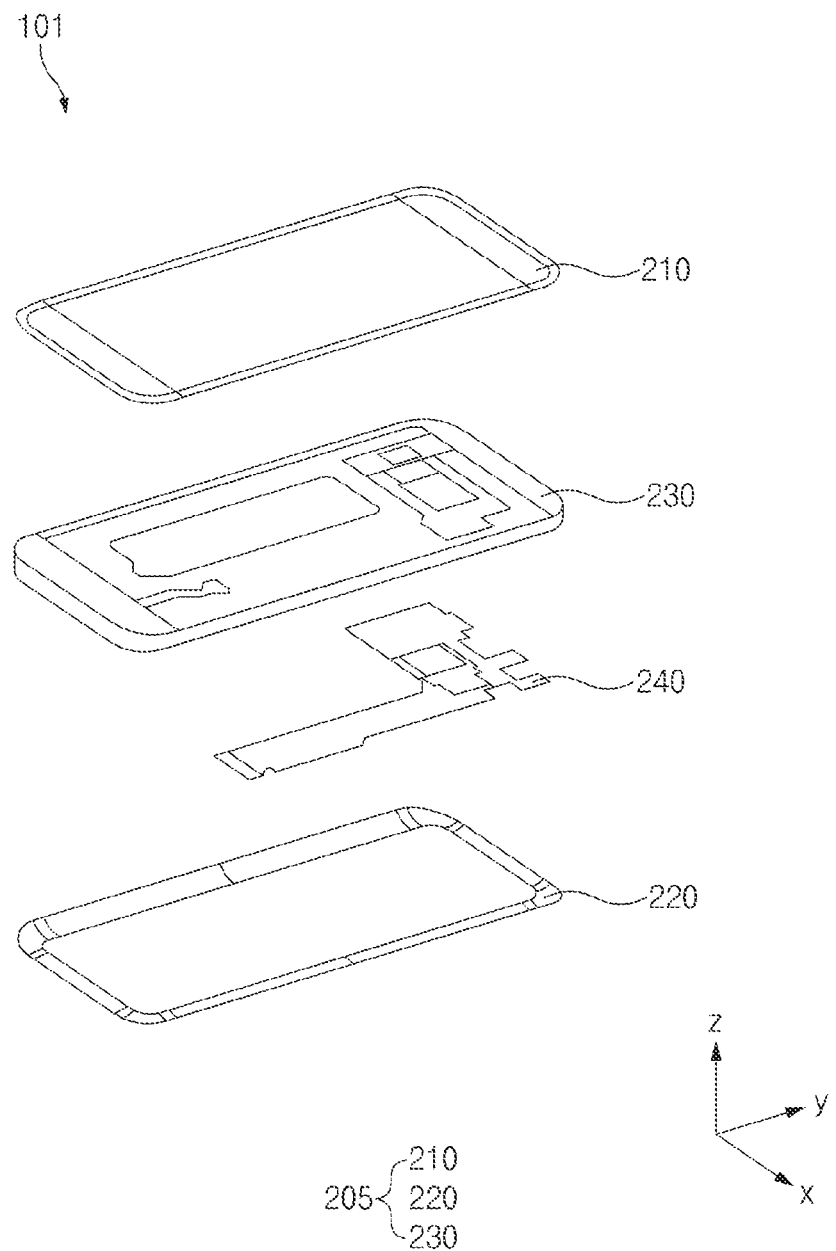
FIG. 2 is an exploded perspective view of an electronic device, according to various embodiments.

FIG. 2 is an exploded perspective view of the electronic device 101, according to various embodiments.

Referring to FIG. 2, the electronic device 101 may include a housing 205 including a front plate 210, a rear plate 220 facing a direction (e.g., −z axis) opposite to a direction (e.g., +z axis), in which the front plate 210 faces, a side member (side bezel structure) 230 to surround the space between the front plate 210 and the rear plate 220. Although FIG. 2 illustrates that the housing 205 includes the front plate 210 and the rear plate 220, a portion (e.g., the side member 230) without the front plate 210 and the rear plate 220 may be referred to as the housing 205 according to another embodiment.

According to an embodiment, the electronic device 101 may further include at least one of different components in addition to components illustrated in FIG. 2. For example, the electronic device 101 may further include at least one of components (e.g., the display device 160, the battery 189, or the sensor module 176) illustrated in FIG. 1, between the front plate 210 and the side member 230, or between the side member 230 and the rear plate 220.

According to an embodiment, the housing 205 may perform a function of protecting the electronic device 101. According to an embodiment, the housing 205 may at least partially include a conductive material (e.g., a metal material). In this case, the conductive material included in the housing 205 may allow an antenna function of transmitting or receiving a signal in a radio frequency (RF) band.

According to an embodiment, the electronic device 101 may include a printed circuit board (PCB) 240 provided inside the housing 205. According to an embodiment, the PCB 240 may include some components to implement the function of the electronic device 101. For example, the PCB 240 may include the processor 120, the memory 130, and the communication module 190. According to an embodiment, the PCB 240 may be electrically connected with the conductive material included in the housing 205 such that the electronic device 101 transmits the signal in the RF band.

Figure 3:
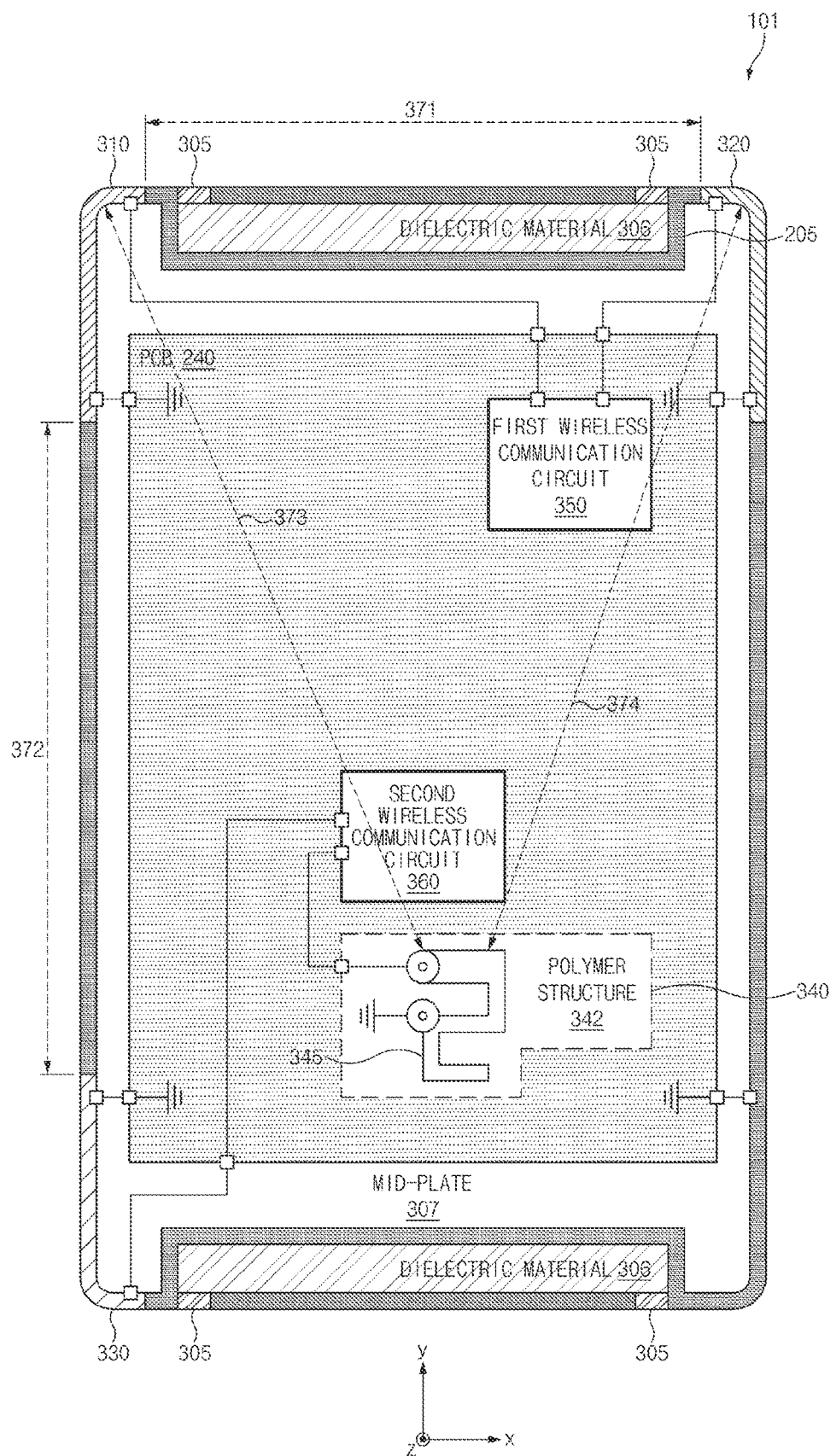
FIG. 3 illustrates a plan view of the electronic device including a conductive pattern, according to various embodiments.

FIG. 3 illustrates a plan view of the electronic device 101 including a conductive pattern 345, according to various embodiments.

Referring to FIG. 3, the electronic device 101 may include the housing 205 and the PCB 240 provided inside the housing 205. When the portion (e.g., the side member 230) without the front plate 210 and the rear plate 220 is referred to as the housing 205, the PCB 240 may be disposed at a lower end portion (e.g., facing a −z-axis direction or between the side member 230 and the rear plate 220 of FIG. 2) of the housing 205.

According to an embodiment, the PCB 240 may include a first wireless communication circuit 350 and a second wireless communication circuit 360 configured to transmit or receive a signal through an antenna (e.g., at least one of 310, 320, 330, or 340). According to an embodiment, the first wireless communication circuit 350 may support a first communication protocol (e.g., Wi-Fi) and the second wireless communication circuit 360 may support a second communication protocol (e.g., LTE). For example, a signal based on the first communication protocol and a signal based on the second communication protocol may differ from each other in at least a portion of a modulation scheme or a frequency band.

According to an embodiment, the housing 205 may include the plurality of antennas 310, 320, and 330, a mid-plate 307, and a dielectric material 306. According to an embodiment, the plurality of antennas 310, 320, and 330 may include at least a portion including a conductive material in the housing 205, to transmit or receive the signal in an RF band. The plurality of antennas 310, 320, and 330 may be electrically isolated from the mid-plate 307 through the dielectric material 306. According to an embodiment, the first antenna 310 and the second antenna 320 may be electrically isolated from each other through a slit structure (e.g., 305). The slit structure may include, for example, a dielectric material. According to an embodiment, the first antenna 310 may be electrically isolated from the third antenna 330 through the ground (GND).

According to an embodiment, the first wireless communication circuit 350 and the second wireless communication circuit 360 may be electrically connected with the plurality of antennas 310, 320, 330, and 340 to transmit or receive a signal in an RF band. For example, the first wireless communication circuit 350 is electrically connected with the first antenna 310 and the second antenna 320, and the second wireless communication circuit 260 may be electrically connected with the third antenna 330 and the fourth antenna 340. According to an embodiment, the electronic device 101 may support Multiple Input Multiple Output (MIMO) based on a standard (e.g., 802.11n) of the first communication protocol using the first wireless communication circuit 350, the first antenna 310 and the second antenna 320. According to an embodiment, the electronic device 101 may support CA (carrier aggregation) based on a standard of the second communication protocol using the second wireless communication circuit 360, the third antenna 330, and the fourth antenna 340. For example, the third antenna 330 may be a PCC antenna, the fourth antenna 340 may be an SCC antenna, or the third antenna 330 may be an SCC antenna, and the fourth antenna 340 may be a PCC antenna.

According to an embodiment, the first antenna 310 and the second antenna 320 may be disposed at the left upper end (e.g., the +y-axis direction and −x-axis direction) of the housing 205 and the right upper end (e.g., the +y-axis direction and +x-axis direction) of the housing 205 to reduce the interference between signals based on the same communication protocol. The comparison in isolation performance between the first antenna 310 or the second antenna 320 and a legacy antenna, which is disposed together on one surface of the upper end (e.g., facing the +y-axis direction) of the housing 205, shows through the following table 1.

TABLE 1

| MIMO antenna measured | Legacy antenna | First antenna (or second antenna) |
|---|---|---|
| TRP [dBm] | 13.6 | 15.2 |
| TIS [dBm] | −84.8 | −85.3 |

In table 1, the first antenna 310 (or the second antenna 320) is 1.6 dB higher than that of the legacy antenna in total radiated power (TRP), and 0.5 dB higher than that of the legacy antenna in total isotopic sensitivity (TIS). Accordingly, the arrangement structures of the first antenna 310 and the second antenna 320 may have isolation performance higher than that of the legacy antenna.

According to an embodiment, the third antenna 330 may be disposed at the left lower end portion (e.g., −y-axis direction and −x-axis direction) of the housing 205 (or the right lower end portion (not illustrated); (e.g., −y-axis direction and +x-axis direction)). According to an embodiment, to reduce the interference between the signal based on the first communication protocol and the signal based on the second communication protocol, a first distance 371 between the first antenna 310 and the second antenna 320 may be shorter than a second distance 372 between the first antenna 310 and the third antenna 330.

According to an embodiment, the fourth antenna 340 may be disposed at the lower end portion (e.g., −z-axis direction or between the PCB 240 and rear plate 220 of FIG. 2) of the PCB 240. The fourth antenna 340 may include a laser direct structuring (LDS) antenna. For example, the fourth antenna 340 may include the conductive pattern 345 provided inside or on a polymer structure 342 having a non-conductive property to radiate a signal. According to an embodiment, the fourth antenna 340 is disposed such that a third distance 373 between the first antenna 310 and the fourth antenna 340 and a fourth distance 374 between the first antenna 310 and the second antenna 320 are longer than λ/4, thereby enhancing isolation performance. In this case, λ may represent a length of a wavelength corresponding to a frequency band of a signal transmitted from the first antenna 310 or the second antenna 320.

Figure 4:
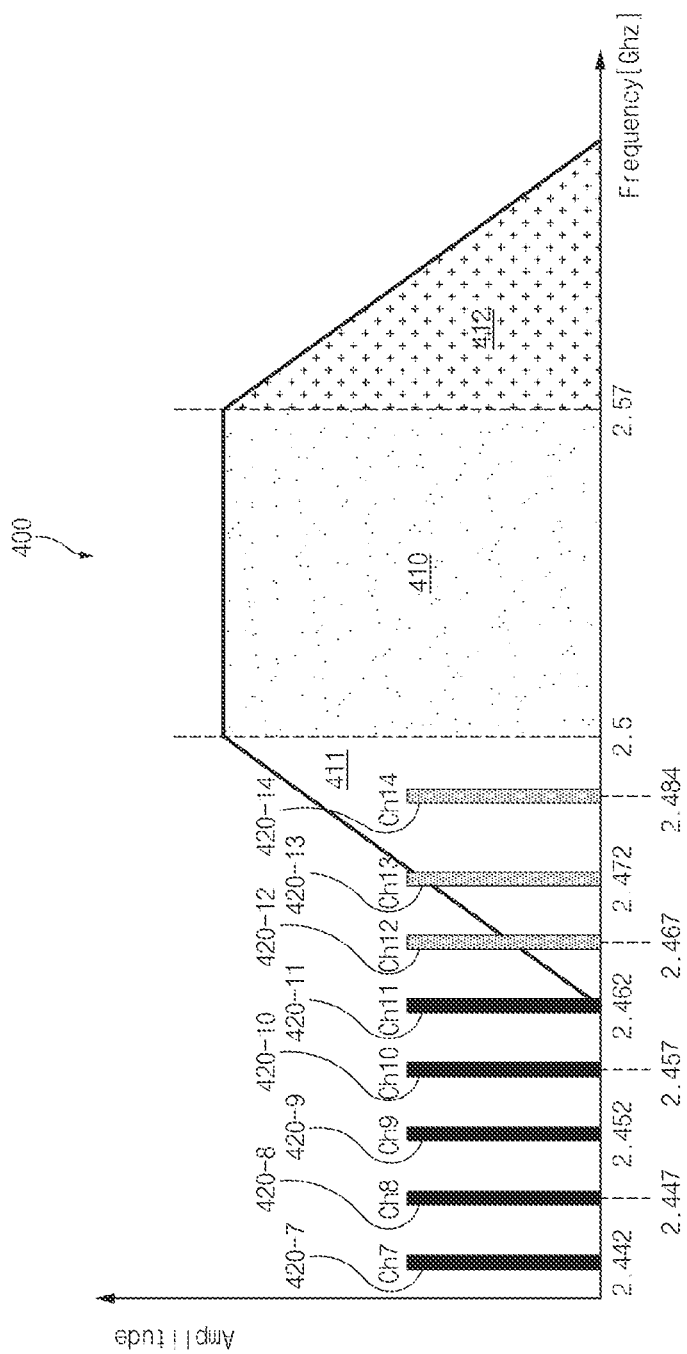
FIG. 4 illustrates a frequency domain, according to various embodiments.

FIG. 4 illustrates a frequency domain, according to various embodiments.

Referring to FIG. 4, a horizontal axis of a graph 400 may indicate a frequency (e.g., unit GHz), and a vertical axis of the graph 400 may indicate an amplitude. According to an embodiment, in the graph 400, first areas 420-7, 420-8, . . . , and 420-14 may correspond to channels 7, 8, . . . , and 14 defined in the standard (e.g., 802.11) of the first communication protocol. The channels 7, 8, . . . , and 14 may include a frequency range from 2.4 gigahertz (GHz) to 2.5 GHz. Second areas 410, 411, and 412 may correspond to a frequency range defined in the standard of the second communication protocol. For example, the second area 410 corresponding to the frequency range from 2.5 GHz to 2.57 GHz may be referred to an uplink frequency band of band 7 in an LTE protocol.

According to an embodiment, a portion (e.g., the first areas 420-12 to 420-14) of the frequency range of a signal transmitted from the first antenna 310 or the second antenna 320 may be superposed with a portion of a frequency range of a signal transmitted from the third antenna 330 or the fourth antenna 340. Accordingly, the degradation in antenna performance may be caused due to the frequency interference. The first antenna 310 and the second antenna 320 may be disposed at a specified distance to the third antenna 330 and the fourth antenna 340 to reduce the frequency interference and to represent higher isolation performance. For example, when the first antenna 310 or the second antenna 320 transmits a signal having a frequency of 2.4 GHz, the third distance 373 and the fourth distance 374 may be longer than λ/4=about 3 cm as in FIG. 3.

Figure 5:
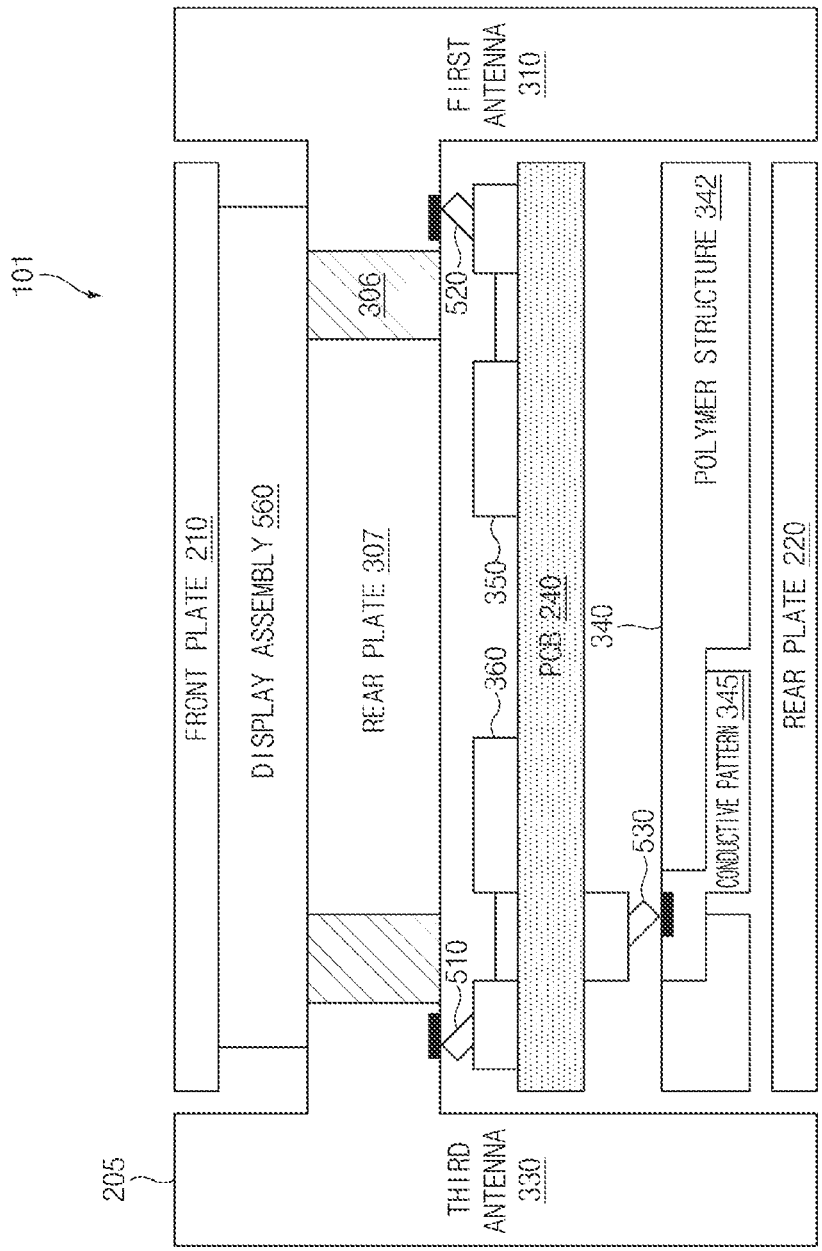
FIG. 5 illustrates a sectional view of an electronic device including a conductive pattern, according to various embodiments.

FIG. 5 illustrates a sectional view of the electronic device 101 including the conductive pattern 345, according to various embodiments.

Referring to FIG. 5, the electronic device 101 may include the front plate 210 and a display assembly 560 (e.g., at least a portion of the display device 160 of FIG. 1) provided at the upper portion (e.g., in a +z-axis direction) of the housing 205 (or the side member 230), and the PCB 240, the fourth antenna 340, and the rear plate 220 provided at the lower portion (e.g., −z-axis direction) of the housing 205. The fourth antenna 340 is a structure including a conductive pattern inside the housing 205, which is different from those of the antennas 310, 320, and 330 to perform an antenna function using at least some areas of the housing 205. Accordingly, the limitation of the antenna performance resulting from the design of the housing 205 may be overcome.

According to an embodiment, at least some areas including a conductive material in the housing 205 may constitute the first antenna 310, the second antenna (not illustrated), and the third antenna 330. The plurality of antennas 310, 320, and 330 may be electrically isolated from the mid-plate 307 through the dielectric material 306.

According to an embodiment, the PCB 240 may include the first wireless communication circuit 350 and the second wireless communication circuit 360 therein or thereon (e.g., +z-axis direction). The first wireless communication circuit 350 may be electrically connected with the housing 205 through an interface 520 (or connection member) to transmit or receive the signal based on the first communication protocol through at least one of the first antenna 310 or the second antenna (illustrated). The second wireless communication circuit 360 may be electrically connected with the housing 205 through an interface 510 (or a connection member) to transmit or receive a signal based on the second communication protocol through the third antenna 330.

According to an embodiment, the second wireless communication circuit 360 may be electrically connected with the fourth antenna 340 (e.g., the conductive pattern 345) through an interface 530 to transmit or receive a signal based on the second communication protocol through the fourth antenna 340 (e.g., the conductive pattern 345).

Figure 6:
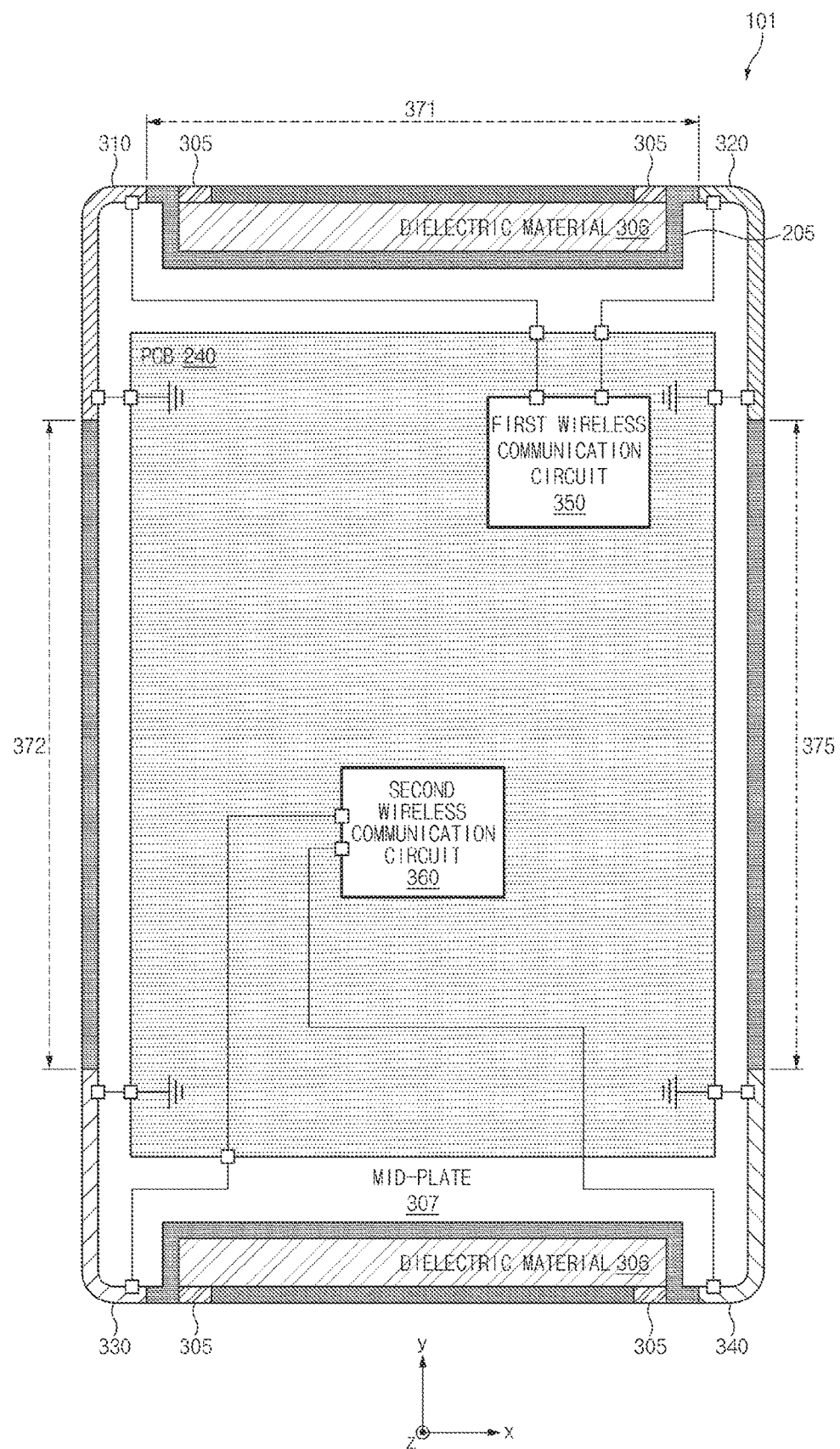
FIG. 6 illustrates a plan view of an electronic device including a plurality of antennas at least partially provided in a housing, according to various embodiments.

FIG. 6 illustrates a plan view of the electronic device 101 including the plurality of antennas 310, 320, 330, and 340 at least partially provided in the housing, according to various embodiments. FIG. 6 illustrates an embodiment in which the fourth antenna 340 is disposed in the form of a housing antenna, such as the first antenna 310, the second antenna 320, and the third antenna 330, instead of the form of an LDS antenna mounted inside the housing 205.

Referring to FIG. 6, the fourth antenna 340 may be disposed in at least some areas (e.g., at the right lower portion (e.g., −y-axis direction and +x-axis direction)) of the housing 205. According to an embodiment, to reduce the interference between the signal based on the second communication protocol and the signal based on the first communication protocol, a fifth distance 375 between the second antenna 320 and the fourth antenna 340 is greater than the first distance 371.

According to an embodiment, the fourth antenna 340 may be electrically connected with the second wireless communication circuit 360. The electronic device 101 may support CA based on the second communication protocol using the third antenna 330 and the fourth antenna 340. According to the structure of antennas illustrated in FIG. 6, the electronic device 101 may support CA based on a plurality of second communication protocols while reducing a mounting space to provide the fourth antenna 340 inside the housing 205.

According to embodiment to be described to be below, the electronic device 101 may support LTE CA while minimizing frequency interference through an antenna (e.g., the second antenna 320) to transmit or receive both the signal based on the first communication protocol and the signal based on the second communication protocol.

Figure 7A:
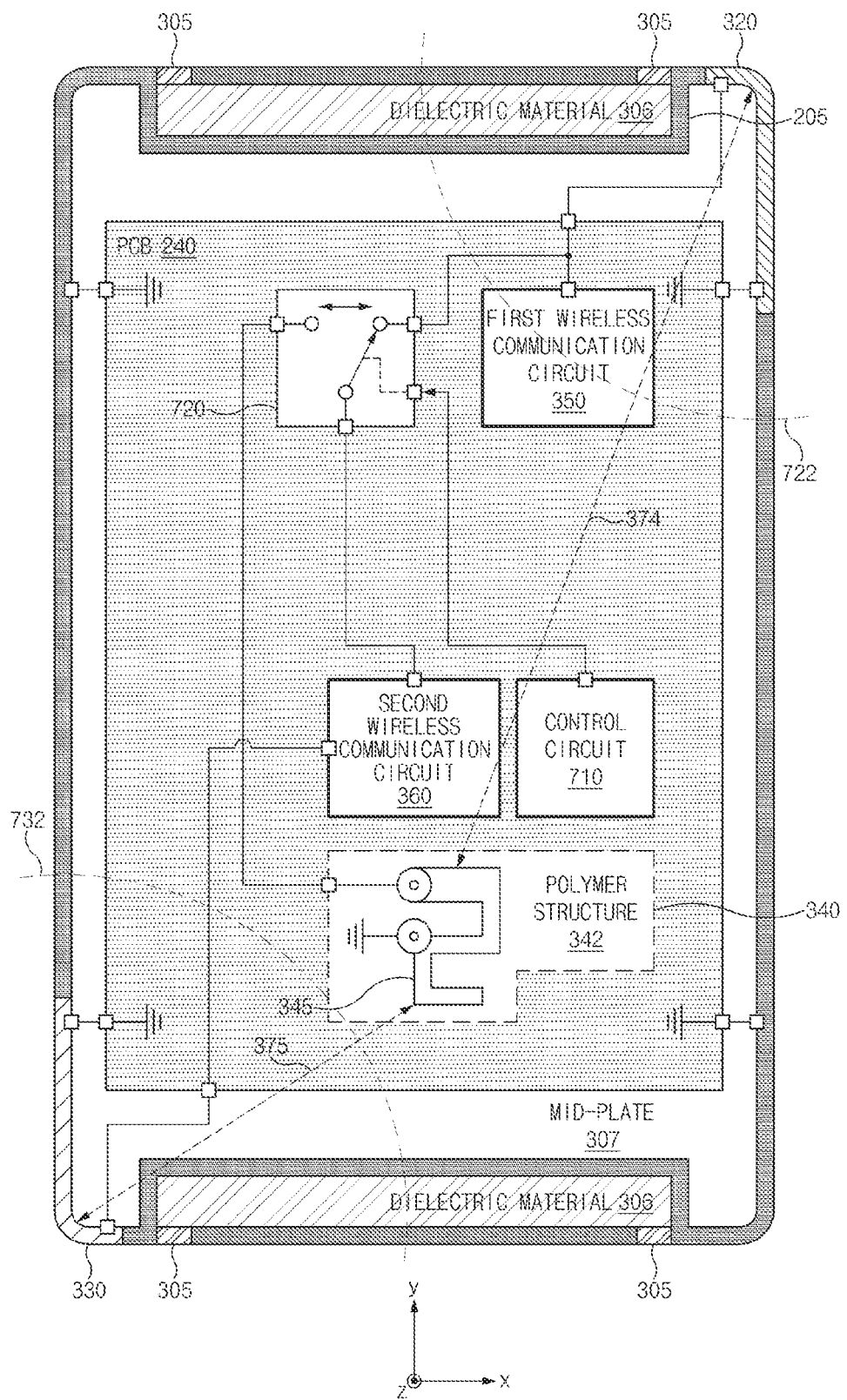
FIG. 7A illustrates a plan view of an electronic device to control a plurality of antennas in the state that a first wireless communication circuit is inactivated, according to various embodiments.
Figure 7B:
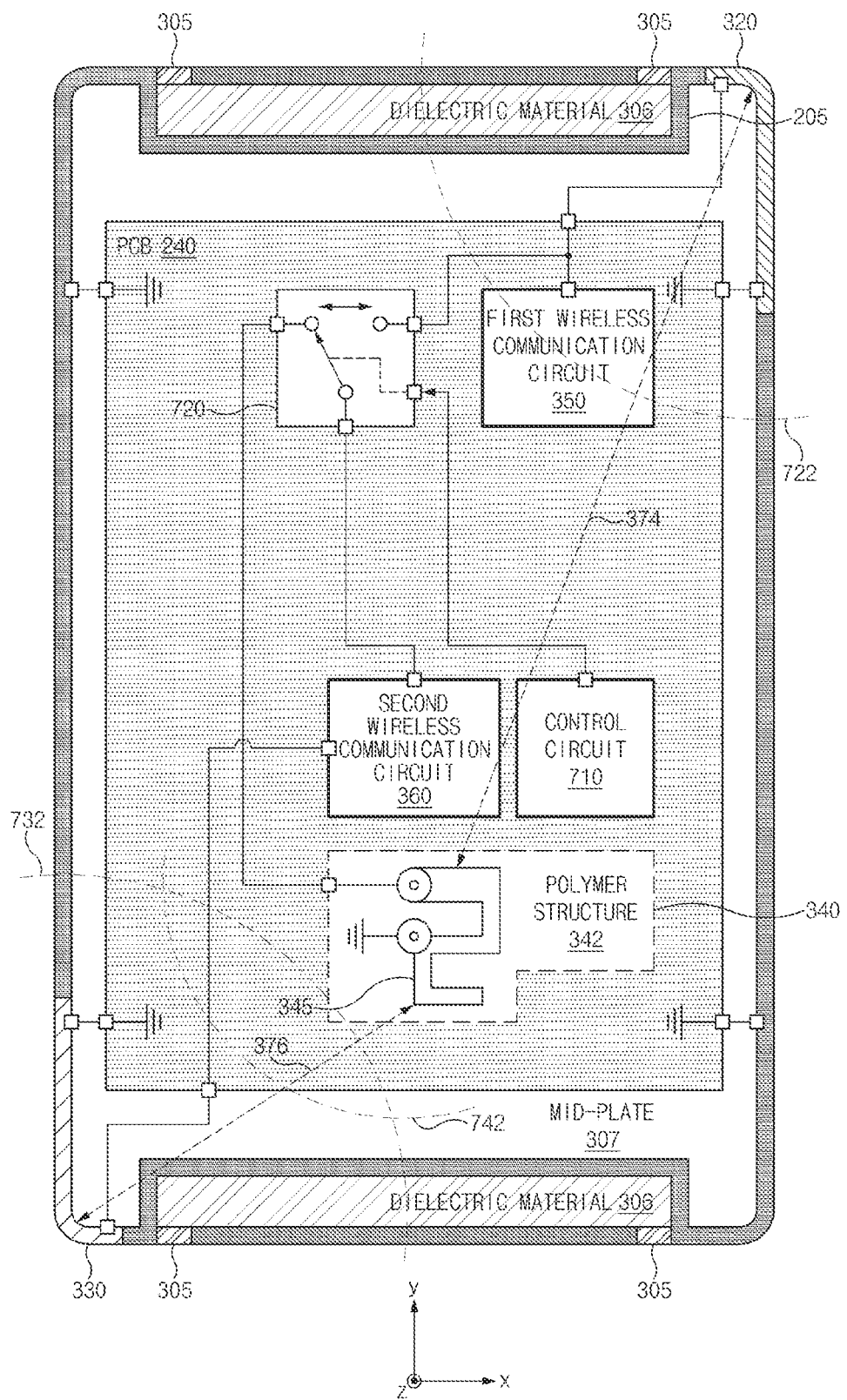
FIG. 7B illustrates a plan view of an electronic device to control a plurality of antennas in the state that a first wireless communication circuit is activated, according to various embodiments.

FIGS. 7A to 7B are plan views of the electronic device 101 to control the plurality of antennas 320, 330, and 340 depending on the activation state of the first wireless communication circuit 350, according to various embodiments. FIG. 7A illustrates an embodiment in which the first wireless communication circuit 350 is inactivated, and FIG. 7B illustrates an embodiment in which the first wireless communication circuit 350 is activated.

Referring to FIGS. 7A and 7B, the electronic device 101 may support only CA instead of MIMO. Accordingly, the electronic device 101 may not include the first antenna 310. The embodiment in which the electronic device 101 uses MIMO will be described with reference to FIG. 11.

According to an embodiment, the electronic device 101 may include a switching circuit 720 inside the housing 205 (inside or on the PCB 240) to selectively connect the second antenna 320 to the first wireless communication circuit 350 and the second wireless communication circuit 360. According to an embodiment, the switching circuit 720 may include Single Pole Double Throw (SPDT).

According to an embodiment, the electronic device 101 may include a control circuit 710 to control the switching circuit 720 inside the housing 205 (e.g., inside or on the PCB 240). According to an embodiment, the control circuit 710 may be a portion of the processor 120 of FIG. 1 or a component separated from the processor 120. According to an embodiment, the control circuit 710 may control the switching circuit 720 based on the activation state of the first wireless communication circuit 350.

For example, when the first wireless communication circuit 350 is inactivated, the control circuit 710 may control the switching circuit 720 to connect the second antenna 320 to the second wireless communication circuit 360 as illustrated in FIG. 7A. The electronic device 101 may support CA based on the second communication protocol using the second antenna 320 and the third antenna 330. Although a wavelength 722 of a signal transmitted from the second antenna 320 is not superposed with a wavelength 732 of a signal transmitted from the third antenna 330, at least a portion of a wavelength 742 of a signal transmitted from the fourth antenna 340 may be superposed with at least a portion of the wavelength 732 of the signal. Accordingly, the antenna structure according to the embodiment as in FIG. 7A may have higher isolation performance (e.g., 20 dB or more) than the antenna structure according to the embodiment as in FIG. 7B.

For another example, when the first wireless communication circuit 350 is activated, the control circuit 710 may control the switching circuit 720 to connect the second antenna 320 with the first wireless communication circuit 350 as illustrated in FIG. 7B. The electronic device 101 may support CA based on the second communication protocol using the third antenna 330 and the fourth antenna 340 while transmitting a signal based on the first communication protocol using the second antenna 320. According to an embodiment, the fourth distance 374 between the second antenna 320 and the fourth antenna 340 may be longer than λ/4 to reduce the frequency interference between the fourth antenna 340 and the second antenna 320. According to an embodiment, a sixth distance 376 between the third antenna 330 and the fourth antenna 340 may be determined such that the isolation performance between the third antenna 330 and the fourth antenna 340 is in the range of 10 dB to 20 dB. When the performance of a signal transmitted through the fourth antenna 340 is compared in terms of the same frequency band as that of the SCC signal in band 7 transmitted through the second antenna 320, the following table 2 is obtained.

TABLE 2

| Antenna measured | Second antenna | Fourth antenna |
|---|---|---|
| TRP [dBM] | 8.5 | 8.3 |
| TIS [dBm] | −87 | −87 |

In table 2, the TIS of the second antenna 320 and the TIS of the fourth antenna 340 are the same, and the difference between the TRP of the second antenna 320 and the TRP of the fourth antenna 340 is 0.2 dB. Accordingly, although the second antenna 320 may have higher isolation performance, the fourth antenna 340 may also have isolation performance the substantially same as that of the second antenna 320.

Figure 8A:
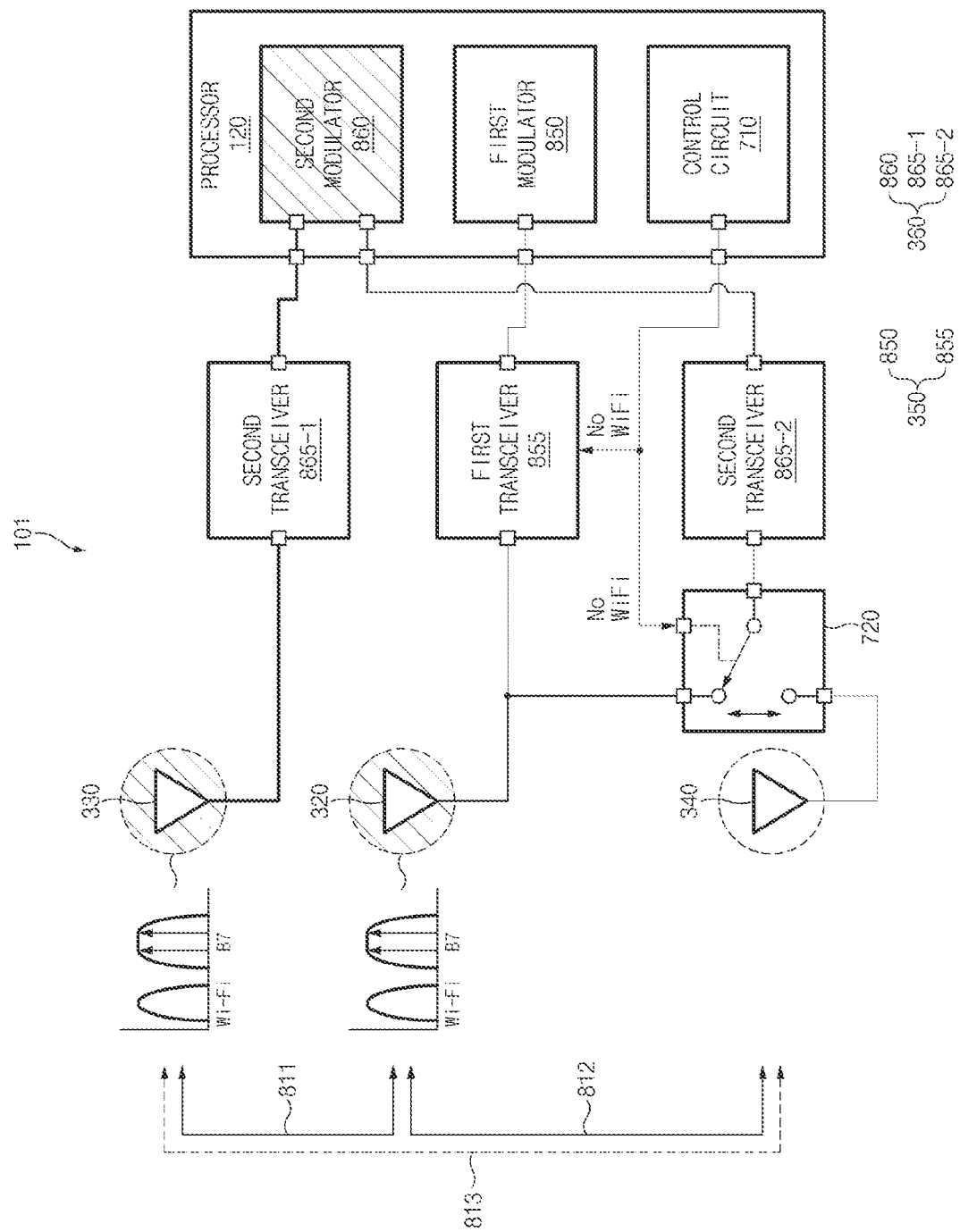
FIG. 8A illustrates a block diagram of an electronic device to control a plurality of antennas in the state that a first wireless communication circuit is inactivated, according to various embodiments.
Figure 8B:
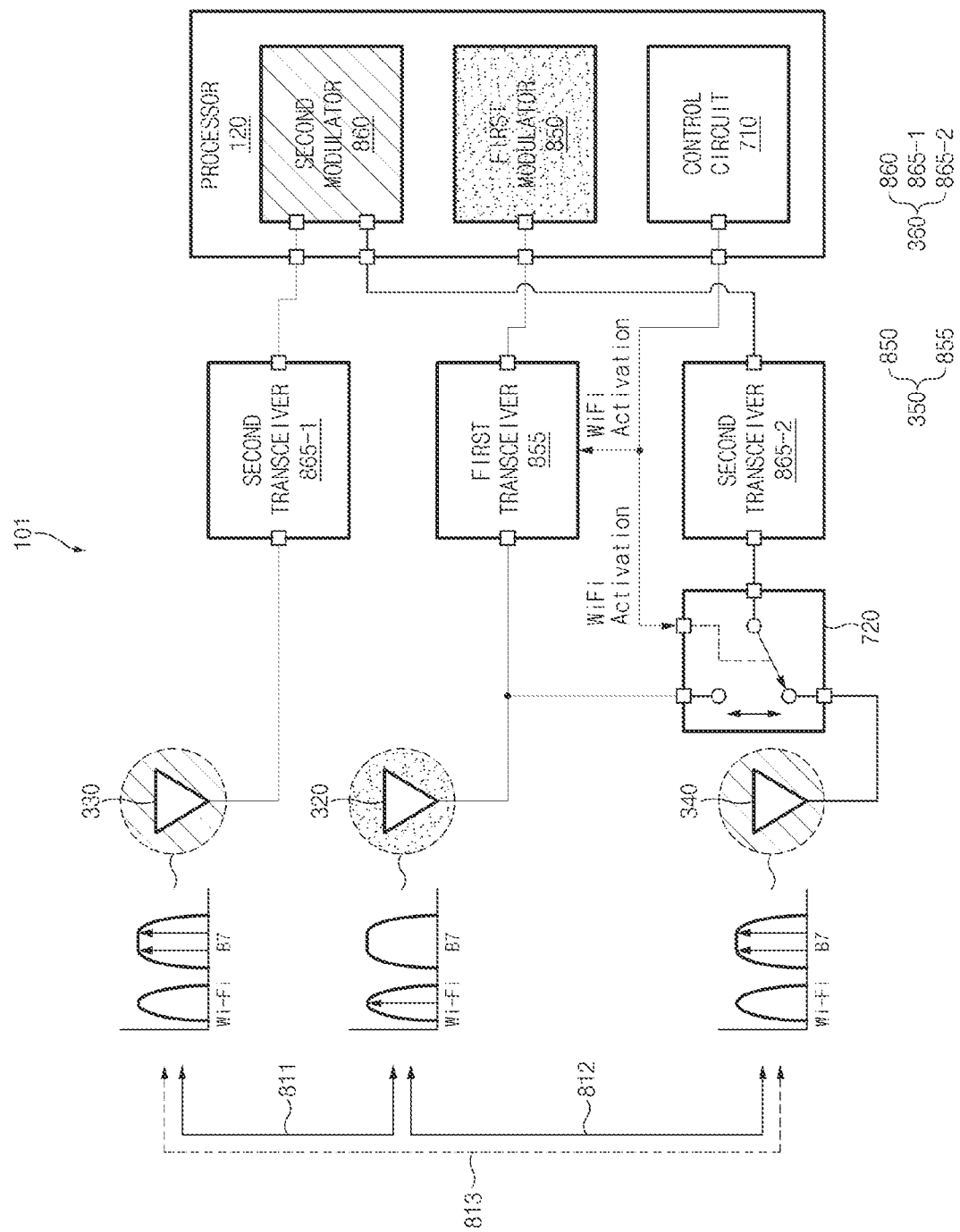
FIG. 8B illustrates a block diagram of an electronic device to control a plurality of antennas in the state that a first wireless communication circuit is activated, according to various embodiments.

FIGS. 8A to 8B are block diagrams of the electronic device 101 to control the plurality of antennas 320, 330, and 340 depending on the activation state of the first wireless communication circuit 350, according to various embodiments. FIG. 8A illustrates an operation of controlling the plurality of antennas 320, 330, and 340 in the state in which the first wireless communication circuit 350 is inactivated, and FIG. 8B illustrates an operation of controlling the plurality of antennas in the state in which the first wireless communication circuit 350 is activated.

Referring to FIGS. 8A and 8B, a first modulator 850 and a first transceiver 855 are at least a portion of the first wireless communication circuit 350 of FIG. 7A, and a second modulator 860 and second transceivers 865-1 and 865-2 may be at least a portion of the second wireless communication circuit 360. According to an embodiment, the processor 120 may include at least one of an application processor (AP) or a communication processor (CP). The processor 120 may include the first modulator 850, the second modulator 860, and the control circuit 710.

According to an embodiment, the first modulator 850 and the second modulator 860 may process signals in a baseband. For example, the first modulator 850 and the second modulator 860 may modulate a signal to be transmitted or demodulate a received signal. According to an embodiment, the first modulator 850 may modulate (or demodulate) a signal through a first modulation scheme based on the first communication protocol, and the second modulator 860 may modulate (or demodulate) a signal through a second modulation scheme based on the second communication protocol.

According to an embodiment, the first transceiver 855 and the second transceiver 865-1 or 865-2 may process signals in an RF band. For example, the first transceiver 855 and the second transceiver 865-1 or 865-2 may modulate a signal, which is to be transmitted, into an analog signal or demodulate a received signal into a digital signal. According to an embodiment, the first transceiver 855, the second transceiver 865-1, and the second transceiver 865-2 may process signals in mutually different frequency ranges. For example, the first transceiver 855 may process a signal in a frequency range corresponding to the first areas 420-7 to 420-14, and the second transceiver 865-1 and the second transceiver 865-2 may process signals in a frequency range corresponding to at least a portion of the second areas 410, 411, and 412. The second transceiver 865-1 and the second transceiver 865-2 may process signals of PCC and SCC, respectively.

According to an embodiment, the control circuit 710 may control the switching circuit 720 depending on the activation state (e.g., at least one of the first modulator 850 or the first transceiver 855) of the first wireless communication circuit 350.

For another example, when the first wireless communication circuit 350 is inactivated, the control circuit 710 may control the switching circuit 720 to connect the second transceiver 865-2 with the second antenna 30, as illustrated in FIG. 8A. The electronic device 101 may transmit or receive a signal based on CA in the frequency band of band 7 through the second antenna 320 and the third antenna 330. The wavelength 722 of the signal transmitted from the second antenna 320 and the wavelength 732 of the signal transmitted from the third antenna 330 are not superposed with each other as shown in FIG. 7A. Accordingly, first isolation 811 between the second antenna 320 and the third antenna 330 may have the higher performance (e.g., 20 dB or more). In addition, because the fourth antenna 340 does not transmit a signal, second isolation 812 between the second antenna 320 and the fourth antenna 340 and third isolation 813 between the third antenna 330 and the fourth antenna 340 may have higher performance.

For another example, when the first wireless communication circuit 350 is activated, the control circuit 710 may control the switching circuit 720 to connect the second transceiver 865-2 with the fourth antenna 340, as illustrated in FIG. 8B. The electronic device 101 may transmit or receive a signal based on the first communication protocol through the second antenna 320 and may transmit or receive a signal based on the second communication protocol through the third antenna 330 and the fourth antenna 340. Even though a signal is transmitted from the fourth antenna 340, the distance (e.g., the fourth distance 374 of FIG. 3) between the fourth antenna 340 and the second antenna 320 is longer than λ/4, so second isolation 812 may have higher performance. Third isolation 813 may have the performance of 10 dB to 20 dB.

Figure 9:
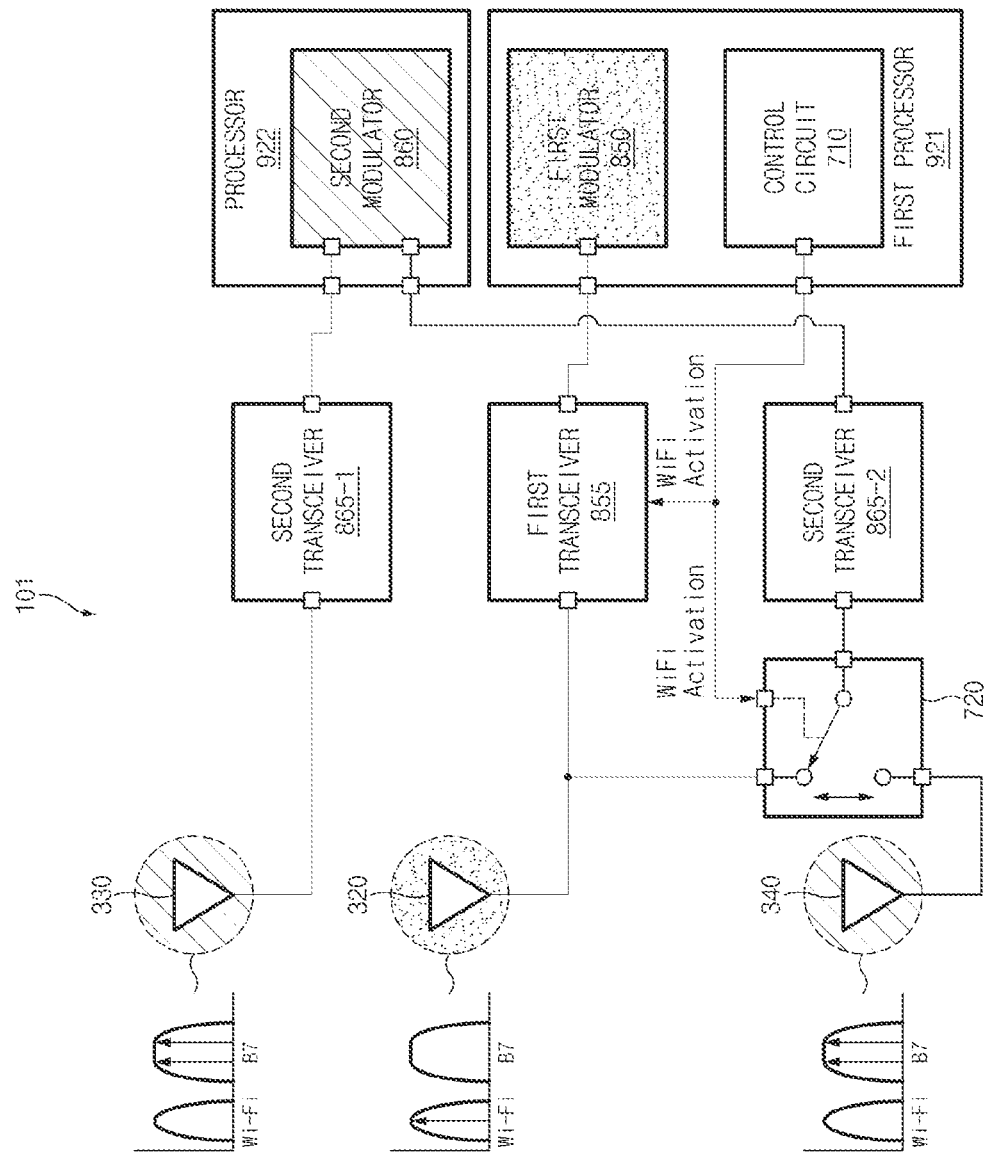
FIG. 9 illustrates a block diagram of an electronic device including a plurality of processors, according to various embodiments.

FIG. 9 illustrates a block diagram of the electronic device 101 including a plurality of processors 921 and 922, according to various embodiments. Although FIG. 9 illustrates only an embodiment in which the first wireless communication circuit 350 is activated, the same principle may be applied to the embodiment in which the first wireless communication circuit 350 is inactivated.

Referring to FIG. 9, the electronic device 101 may include the plurality of processors 921 and 922. According to an embodiment, the plurality of processors 921 and 922 may be at least a portion of the processor 120 or components separated from the processor 120. According to an embodiment, the first processor 921 may include the first modulator 850, and the second processor 921 may include the second modulator 860. Although FIG. 9 illustrates that the control circuit 710 is included in the first processor 921, the control circuit 710 may be included in the second processor 922, according to various embodiments.

Figure 10:
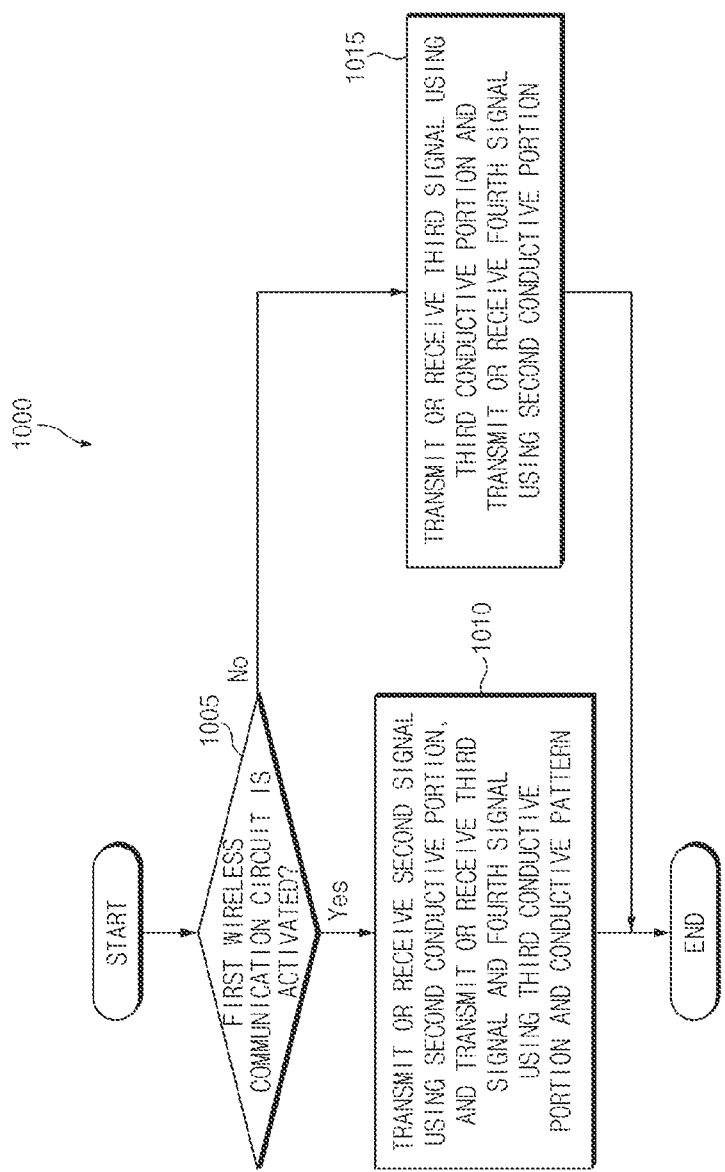
FIG. 10 is a flowchart illustrating the operation of an electronic device to control a plurality of antennas, depending on an activation state of a first wireless communication circuit, according to various embodiments.

FIG. 10 is a flowchart illustrating the operation of the electronic device 101 to control the plurality of antennas 320, 330, and 340, depending on the activation state of the first wireless communication circuit 350, according to various embodiments. The operations illustrated in FIG. 10 may be performed by the electronic device 101 or a component (e.g., the processor 120 or the control circuit 710) included in the electronic device 101.

Referring to FIG. 10, in operation 1005 of method 1000, the electronic device 101 may determine (or identify) whether the first wireless communication circuit 350 is activated. According to an embodiment, the electronic device 101 may determine the state of the first wireless communication circuit 350, depending on a user input to activate or inactivate the function of the first communication protocol or depending on the presence of an external electronic device (e.g., the access point (AP)) to be connected based on the first communication protocol.

When the first wireless communication circuit 350 is activated, in operation 1010, the electronic device 101 may transmit or receive a second signal of a first signal and the second signal having a frequency in the first frequency range (e.g., the first areas 420-7 to 420-14 of FIG. 4) through a second conductive portion (e.g., the second antenna 320) and may transmit or receive the third signal and the fourth signal having a frequency in the second frequency range (e.g., the second areas 410, 411, and 412 of FIG. 4) through the third conductive portion (e.g., the third antenna 330) and the conductive pattern 345. According to an embodiment, when the electronic device 101 uses MIMO, the electronic device 101 may transmit or receive the first signal using the first antenna 310.

When the first wireless communication circuit 350 is inactivated, in operation 1015, the electronic device 101 may transmit or receive the third signal through the third conductive portion, and may transmit or receive the fourth signal using the second conductive portion.

Figure 11:
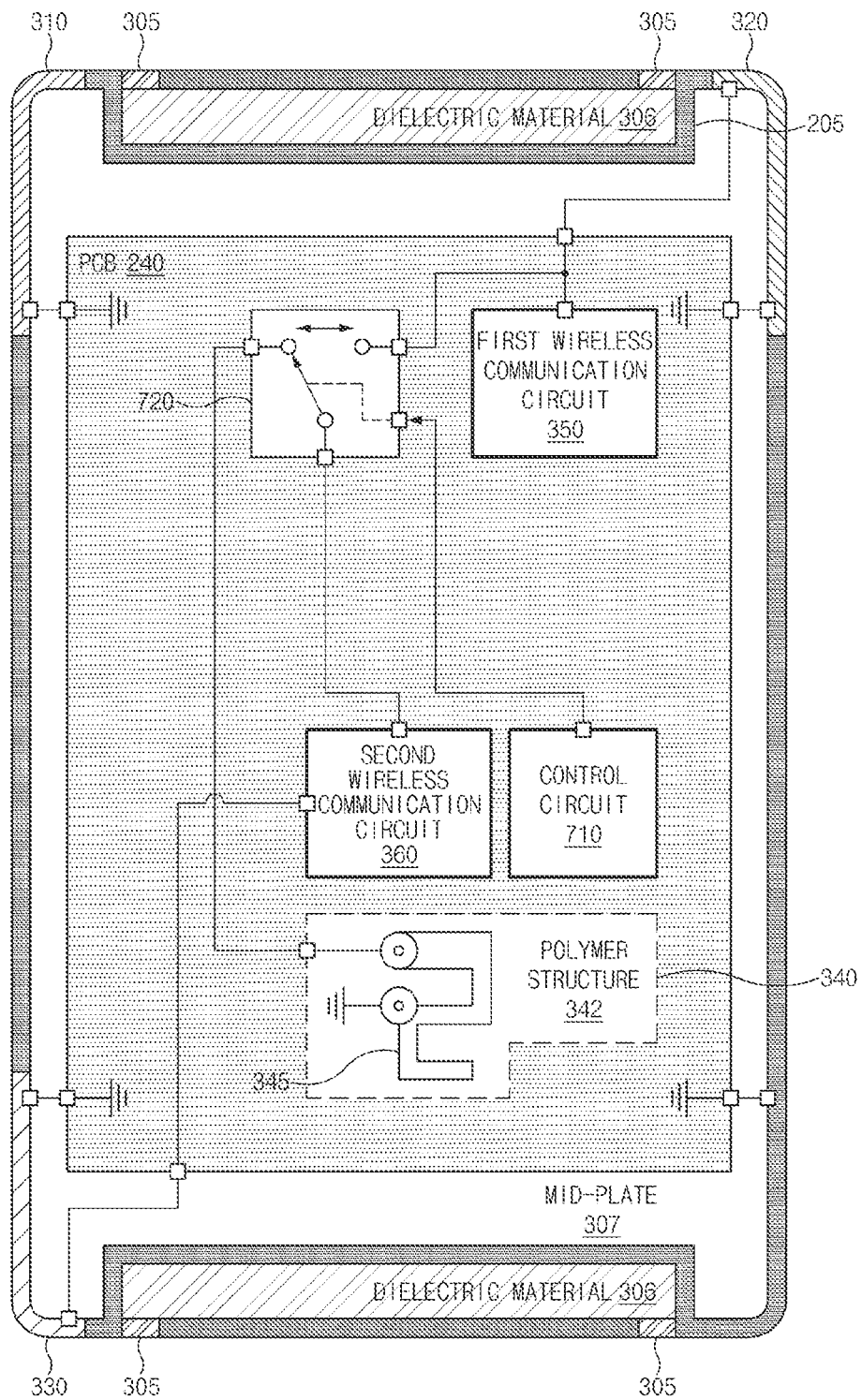
FIG. 11 illustrates a plan view of an electronic device to control a plurality of antennas supporting MIMO, depending on an activation state of a first wireless communication circuit, according to various embodiments.

FIG. 11 illustrates a plan view of the electronic device 101 to control the plurality of antennas 310 and 320 supporting MIMO, depending on the activation state of the first wireless communication circuit 350, according to various embodiments. Although FIG. 11 illustrates only an embodiment in which the first wireless communication circuit 350 is activated, the same principle may be applied to the embodiment in which the first wireless communication circuit 350 is inactivated.

Referring to FIG. 11, the electronic device 101 may further include the first antenna 310 supporting MIMO. The first antenna 310 may be electrically connected with the first wireless communication circuit 350. When the first wireless communication circuit 350 is activated, the control circuit 710 may control the switching circuit 720 to connect the second wireless communication circuit 360 with the fourth antenna 340. The electronic device 101 may support MIMO based on the first communication protocol using the first antenna 310 and the second antenna 320, and may support CA based on the second communication protocol using the third antenna 330 and the fourth antenna 340.

Figure 12:
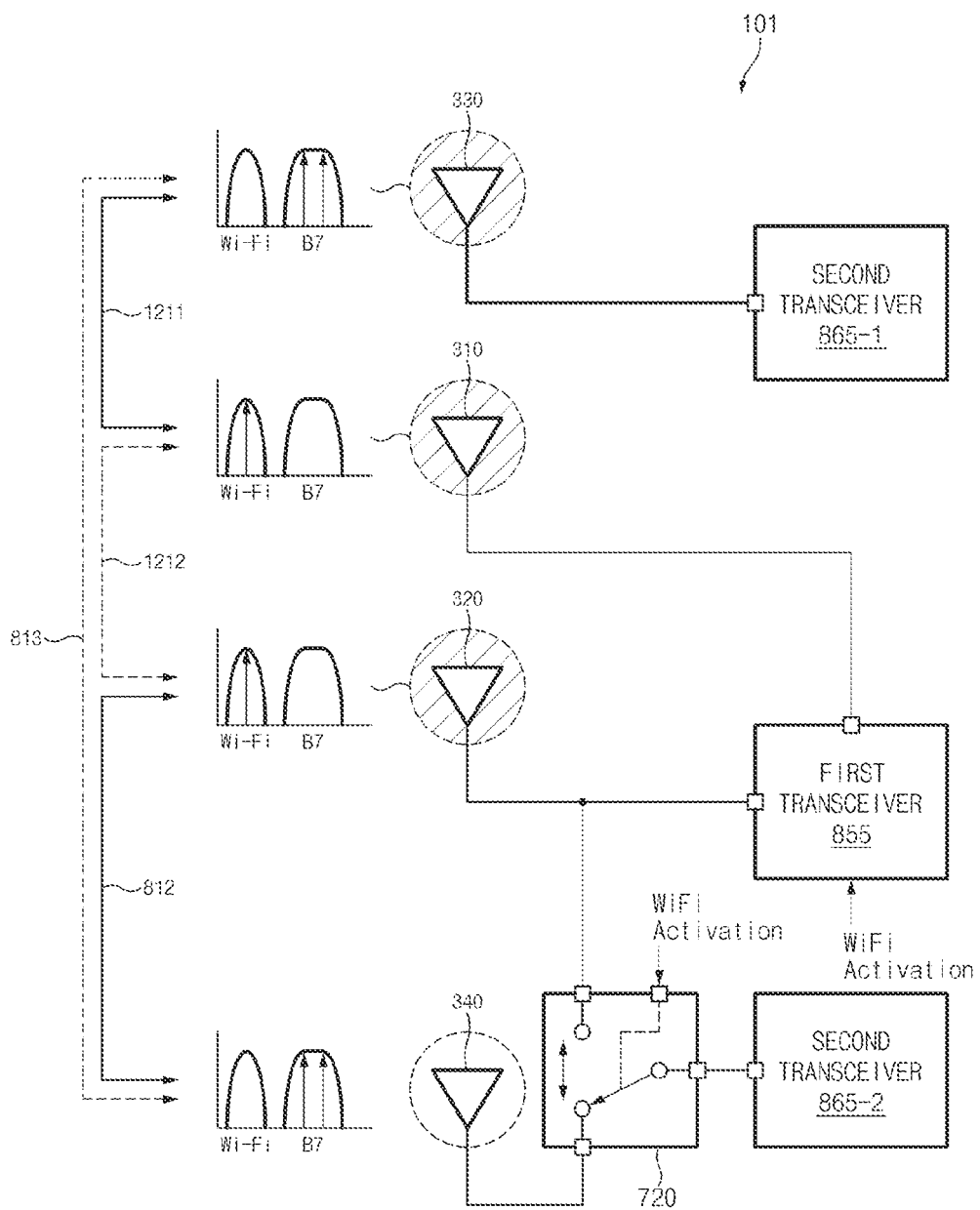
FIG. 12 illustrates a block diagram of an electronic device to control a plurality of antennas supporting MIMO, depending on an activation state of a first wireless communication circuit, according to various embodiments.

FIG. 12 illustrates a block diagram of the electronic device 101 to control the plurality of antennas 310 and 320 supporting the MIMO, depending on the activation state of the first wireless communication circuit 350, according to various embodiments.

Referring to FIG. 12, the first antenna 310 and the second antenna 320 may be electrically connected with the first transceiver 855. When the first wireless communication circuit (e.g., the first transceiver 855) is activated, the second transceiver 865-2 may be connected with the fourth antenna 340 through the switching circuit 720. The electronic device 101 may transmit a signal based on the first communication protocol using the first antenna 310 and the second antenna 320, and may transmit a signal based on the second communication protocol using the third antenna 330 and the fourth antenna 340.

According to an embodiment, the electronic device 101 may maintain (e.g., in the range of 10 dB to 20 dB) the isolation (e.g., the third isolation 813 or the fifth isolation 1212) performance between antennas to transmit or receive a signal based on the same communication protocol and may improve (e.g., by 20 dB or more) the performance of the isolation (e.g., the fourth isolation 1211 or the second isolation 812) between antennas to transmit or receive signals based on mutually different communication protocols.

Figure 13:
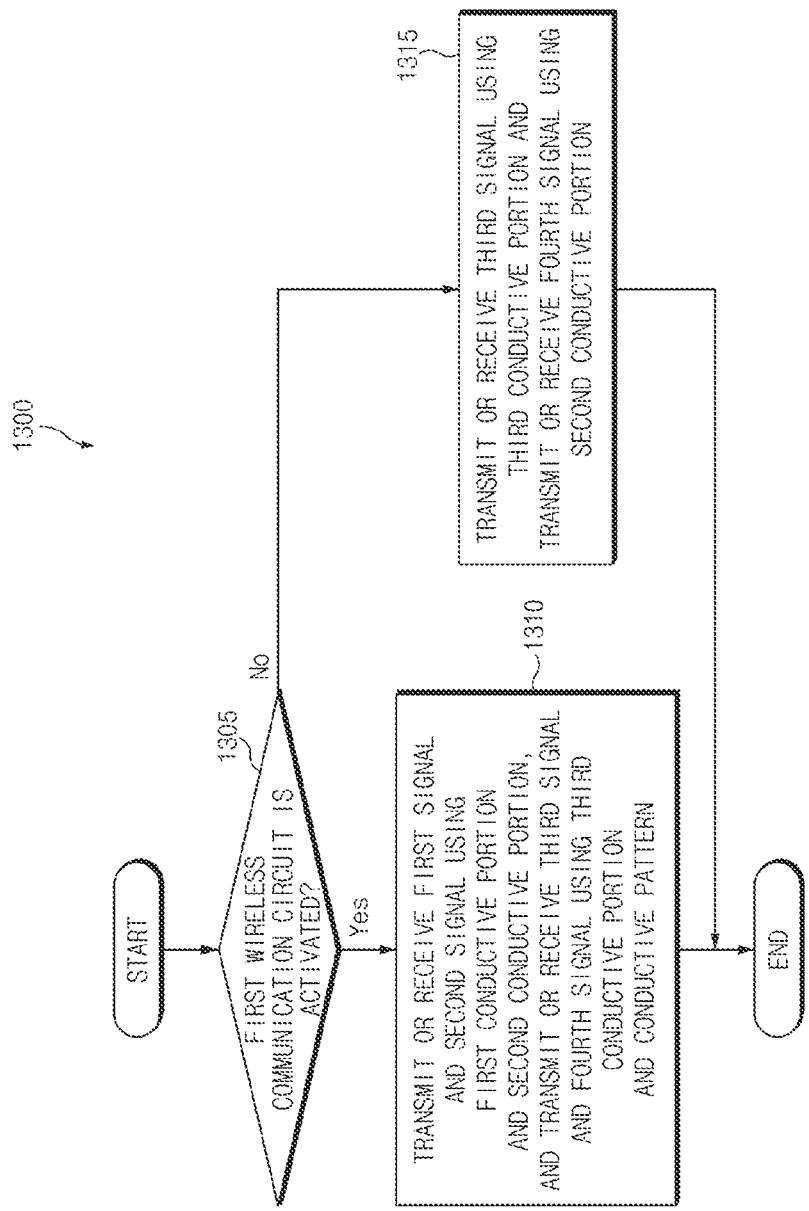
FIG. 13 is a flowchart illustrating the operation of an electronic device to control a plurality of antennas supporting MIMO, depending on an activation state of a first wireless communication circuit, according to various embodiments.

FIG. 13 is a flowchart illustrating the operation of the electronic device 101 to control the plurality of antennas 310 and 320 supporting MIMO depending on the activation state of the first wireless communication circuit 350, according to various embodiments.

Referring to FIG. 13, in operations 1305, the electronic device 101 may determine (or identify) whether the first wireless communication circuit 350 is activated. According to an embodiment, the electronic device 101 may determine the activation state of the first wireless communication circuit 350, depending on a user input to activate or deactivate the function of the first communication protocol, or depending on the presence of an external electronic device (e.g., the access point (AP)) to be connected based on the first communication protocol.

When the first wireless communication circuit 350 is activated, in operation 1310, the electronic device 101 may transmit or receive the first signal and the second signal having a frequency in the first frequency range through the first conductive portion (e.g., the first antenna 310) and the second conductive portion (e.g., the second antenna 320), and may transmit or receive a third signal and a fourth signal having a frequency in the second frequency band using the third conductive portion (e.g., the third antenna 330) and the conductive pattern 345.

When the first wireless communication circuit 350 is inactivated, in operation 1315, the electronic device 101 may transmit or receive the third signal through the third conductive portion, and may transmit or receive a fourth signal using the second conductive portion.

As described above, an electronic device (e.g., the electronic device 101 of FIG. 1) may include a housing (e.g., the housing 210 of FIG. 2) including a first plate (e.g., the front plate 210 of FIG. 2), a second plate (e.g., the rear plate 220 of FIG. 2) facing a direction opposite to the first plate, a side member (e.g., the side member 230 of FIG. 2) surrounding a space between the first plate and the second plate, a first conductive portion (e.g., the first antenna 310 of FIG. 3), a second conductive portion (e.g., the second antenna 320 of FIG. 3) electrically isolated from the first conductive portion, and a third conductive portion (e.g., the third antenna 330 of FIG. 3) electrically isolated from the first conductive portion and the second conductive portion, a polymer structure (e.g., the polymer structure 342 of FIG. 3) disposed in the space, a conductive pattern (e.g., the conductive pattern 345 of FIG. 3) formed inside the polymer structure or on the polymer structure, a first wireless communication circuit (e.g., the first wireless communication circuit 350 of FIG. 3) that is disposed in the space and transmits or receives a first signal and a second signal, which have a frequency in a first frequency range, through Multiple Input, Multiple Output (MIMO) using the first conductive portion and the second conductive portion, respectively, and a second wireless communication circuit (e.g., the second wireless communication circuit 360 of FIG. 3) that is disposed in the space and transmits or receives a third signal and a fourth signal having a frequency in a second frequency range through Carrier Aggregation (CA) using the third conductive portion and the conductive pattern, respectively.

According to an embodiment, a first distance (e.g., the first distance 371 of FIG. 3) between the first conductive portion and the second conductive portion is shorter than a second distance (e.g., the second distance 372 of FIG. 3) between the first conductive portion and the third conductive portion.

According to an embodiment, a third distance (e.g., the third distance 373 of FIG. 3) between the first conductive portion and the conductive pattern and a fourth distance (e.g., the fourth distance 374 of FIG. 3) between the second conductive portion and the conductive pattern may be longer than $\lambda/4$, and the $\lambda$ may be based on a frequency selected from the first frequency range.

According to an embodiment, the first wireless communication circuit may be configured to support Wireless Local Area Network (WLAN).

According to an embodiment, the second wireless communication circuit may be configured to support cellular communication.

According to an embodiment, the first frequency range may be in a range of 2400 MHz to 2500 MHz, and the second frequency range may be in a range of 2500 MHz to 2570 MHz.

According to an embodiment, a printed circuit board (PCB) (e.g., the PCB 240 of FIG. 3) disposed in the space may be further included, in which the first wireless communication circuit and the second wireless communication circuit are disposed in the PCB, and the polymer structure may be interposed between the PCB and the second plate.

According to an embodiment, the first conductive portion and the third conductive portion may be electrically isolated from each other through a ground (GND).

As described above, an electronic device (e.g., the electronic device 101 of FIG. 1) may include a housing (e.g., the housing 210 of FIG. 2) including a first plate (e.g., the front plate 210 of FIG. 2), a second plate (e.g., the rear plate 220 of FIG. 2) facing a direction opposite to the first plate, a side member (e.g., the side member 230 of FIG. 2) surrounding a space between the first plate and the second plate, a first conductive portion (e.g., the first antenna 310 of FIG. 3), a second conductive portion (e.g., the second antenna 320 of FIG. 3) electrically isolated from the first conductive portion, and a third conductive portion (e.g., the third antenna 330 of FIG. 3) electrically isolated from the first conductive portion and the second conductive portion, a polymer structure (e.g., the polymer structure 342 of FIG. 3) disposed in the space, a conductive pattern (e.g., the conductive pattern 345 of FIG. 3) formed inside the polymer structure or on the polymer structure, a first wireless communication circuit (e.g., the first wireless communication circuit 350 of FIG. 3) that is disposed in the space and transmits or receives a first signal and a second signal, which have a frequency in a first frequency range, through Multiple Input, Multiple Output (MIMO), a second wireless communication circuit (e.g., the second wireless communication circuit 360 of FIG. 3) that is disposed in the space and transmits or receives a third signal and a fourth signal having a frequency in a second frequency range through Carrier Aggregation (CA), and a control circuit (e.g., the control circuit 710 of FIG. 7A) operatively connected with the first wireless communication circuit and the second wireless communication circuit. The control circuit may transmit or receive the first signal and the second signal using the first conductive portion and the second conductive portion, respectively, and transmit or receive the third signal and the fourth signal using the third conductive portion and the conductive pattern, respectively, when the first wireless communication circuit is activated, and may transmit or receive the third signal using the third conductive portion, and transmit or receive the fourth signal using the second conductive portion, when the first wireless communication circuit is inactivated.

According to an embodiment, a first distance (e.g., the first distance 371 of FIG. 3) between the first conductive portion and the second conductive portion is shorter than a second distance (e.g., the second distance 372 of FIG. 3) between the first conductive portion and the third conductive portion.

According to an embodiment, a third distance (e.g., the third distance 373 of FIG. 3) between the first conductive portion and the conductive pattern and a fourth distance (e.g., the fourth distance 374 of FIG. 3) between the second conductive portion and the conductive pattern may be longer than $\lambda/4$, and the $\lambda$ may be based on a frequency selected from the first frequency range.

According to an embodiment, the first wireless communication circuit may be configured to support a wireless local area network (WLAN) protocol.

According to an embodiment, the second wireless communication circuit may be configured to support cellular communication.

According to an embodiment, the first frequency range may be in a range of 2400 MHz to 2500 MHz, and the second frequency range may be in a range of 2500 MHz to 2570 MHz.

According to an embodiment, the electronic device may further include a first processor (e.g., the first processor 921 of FIG. 9) and a second processor (e.g., the second processor 922 of FIG. 9). The first processor may include the first wireless communication circuit, and the second processor may include the second wireless communication circuit.

As described above, an electronic device (e.g., the electronic device 101 of FIG. 1) may include a housing (e.g., the housing 210 of FIG. 2) including a first plate (e.g., the front plate 210 of FIG. 2), a second plate (e.g., the rear plate 220 of FIG. 2) facing a direction opposite to the first plate, a side member (e.g., the side member 230 of FIG. 2) surrounding a space between the first plate and the second plate, a first conductive portion (e.g., the first antenna 310 of FIG. 3), and a second conductive portion (e.g., the second antenna 320 of FIG. 3) electrically isolated from the first conductive portion, a polymer structure (e.g., the polymer structure 342 of FIG. 3) disposed in the space, a conductive pattern (e.g., the conductive pattern 345 of FIG. 3) formed inside the polymer structure or on the polymer structure, a first wireless communication circuit (e.g., the first wireless communication circuit 350 of FIG. 3) that is disposed in the space and transmits or receive a first signal, which has a frequency in a first frequency range, a second wireless communication circuit (e.g., the second wireless communication circuit 360 of FIG. 3) that is disposed in the space and transmits or receive a second signal and a third signal having a frequency in a second frequency range through CA, and a control circuit (e.g., the control circuit 710 of FIG. 7A) operatively connected with the first wireless communication circuit and the second wireless communication circuit. The control circuit may transmit or receive the first signal using the first conductive portion, and transmit or receive the second signal and the third signal using the second conductive portion and the conductive pattern, respectively, when the first wireless communication circuit is activated, and may transmit or receive the second signal using the second conductive portion and transmit or receive the third signal using the first conductive portion when the first wireless communication circuit is inactivated.

According to an embodiment, the distance between the first conductive portion and the conductive pattern may be longer than $\lambda/4$ and the $\lambda$ may be based on a frequency selected from the first frequency range.

According to an embodiment, the first wireless communication circuit may be configured to support a wireless local area network (WLAN) protocol.

According to an embodiment, the second wireless communication circuit may be configured to support cellular communication.

According to an embodiment, the first frequency range may be in a range of 2400 MHz to 2500 MHz, and the second frequency range may be in a range of 2500 MHz to 2570 MHz.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a housing including: a first plate; a second plate facing a direction opposite to the first plate; a side member surrounding a space between the first plate and the second plate; a first conductive portion; a second conductive portion electrically isolated from the first conductive portion; and a third conductive portion electrically isolated from the first conductive portion and the second conductive portion;
    a polymer structure disposed in the space;
    a conductive pattern formed inside the polymer structure or on the polymer structure;
    a first wireless communication circuit disposed in the space and configured to transmit or receive a first signal and a second signal, which have a frequency in a first frequency range, through Multiple Input, Multiple Output (MIMO) using the first conductive portion and the second conductive portion, respectively;
    a second wireless communication circuit disposed in the space and configured transmit or receive a third signal and a fourth signal, which have a frequency in a second frequency range, through Carrier Aggregation (CA) using the third conductive portion and the conductive pattern, respectively; and
    a printed circuit board (PCB) disposed in the space, wherein the first wireless communication circuit and the second wireless communication circuit are disposed in the PCB, and
    wherein the polymer structure is interposed between the PCB and the second plate.

2. The electronic device of claim 1, wherein a first distance between the first conductive portion and the second conductive portion is shorter than a second distance between the first conductive portion and the third conductive portion.

3. The electronic device of claim 2, wherein a third distance between the first conductive portion and the conductive pattern and a fourth distance between the second conductive portion and the conductive pattern are longer than λ/4, and
    wherein λ is based on a frequency selected from the first frequency range.

4. The electronic device of claim 1, wherein the second wireless communication circuit is configured to support cellular communication.

5. The electronic device of claim 1, wherein the first wireless communication circuit is configured to support Wireless Local Area Network (WLAN).

6. The electronic device of claim 1, wherein the first frequency range is a range of 2400 MHz to 2500 MHz, and
    wherein the second frequency range is a range of 2500 MHz to 2570 MHz.

7. The electronic device of claim 1, wherein the first conductive portion and the third conductive portion are electrically isolated from each other through a ground (GND).

8. An electronic device comprising:
a housing including a first plate; a second plate facing a direction opposite to the first plate; a side member surrounding a space between the first plate and the second plate; a first conductive portion; a second conductive portion electrically isolated from the first conductive portion; and a third conductive portion electrically isolated from the first conductive portion and the second conductive portion;
a polymer structure disposed in the space;
a conductive pattern formed inside the polymer structure or on the polymer structure;
a first wireless communication circuit disposed in the space and configured to transmit or receive a first signal and a second signal, which have a frequency in a first frequency range, through Multiple Input, Multiple Output (MIMO);
a second wireless communication circuit disposed in the space and configured to transmit or receive a third signal and a fourth signal, which have a frequency in a second frequency range, through Carrier Aggregation (CA);
a printed circuit board (PCB) disposed in the space, wherein the first wireless communication circuit and the second wireless communication circuit are disposed in the PCB, and wherein the polymer structure is interposed between the PCB and the second plate; and
a control circuit operatively connected with the first wireless communication circuit and the second wireless communication circuit,
wherein the control circuit is configured to:
transmit or receive the first signal and the second signal using the first conductive portion and the second conductive portion, respectively, and transmit or receive the third signal and the fourth signal using the third conductive portion and the conductive pattern, respectively, when the first wireless communication circuit is activated, and
transmit or receive the third signal using the third conductive portion, and transmit or receive the fourth signal using the second conductive portion, when the first wireless communication circuit is inactivated.

9. The electronic device of claim 8, wherein a first distance between the first conductive portion and the second conductive portion is shorter than a second distance between the first conductive portion and the third conductive portion.

10. The electronic device of claim 9, wherein a third distance between the first conductive portion and the conductive pattern and a fourth distance between the second conductive portion and the conductive pattern are longer than $\lambda/4$, and
wherein $\lambda$ is based on a frequency selected from the first frequency range.

11. The electronic device of claim 8, wherein the first wireless communication circuit supports a Wireless Local Area Network (WLAN) protocol.

12. The electronic device of claim 8, wherein the second wireless communication circuit is configured to support a cellular communication protocol.

13. The electronic device of claim 8, wherein the first frequency range is a range of 2400 MHz to 2500 MHz, and
wherein the second frequency range is a range of 2500 MHz to 2570 MHz.

14. The electronic device of claim 8, further comprising:
a first processor and a second processor,
wherein the first processor includes the first wireless communication circuit, and the second processor includes the second wireless communication circuit.

* * * * *